Sept. 15, 1964     I. SILVERMAN     3,149,072
LIQUID CLARIFICATION APPARATUS
Filed Oct. 30, 1962
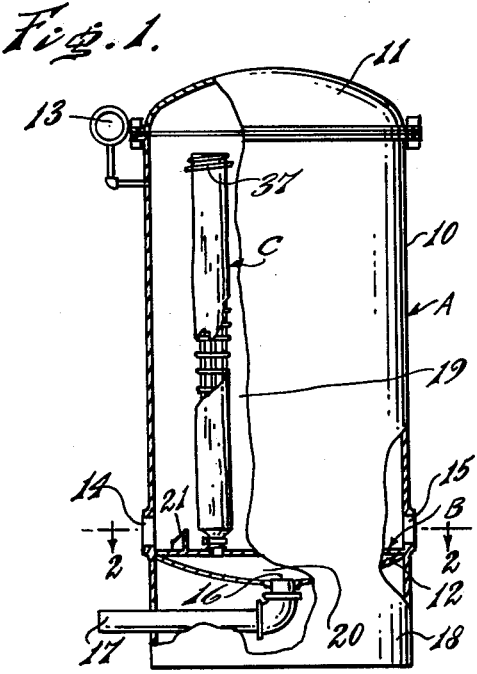
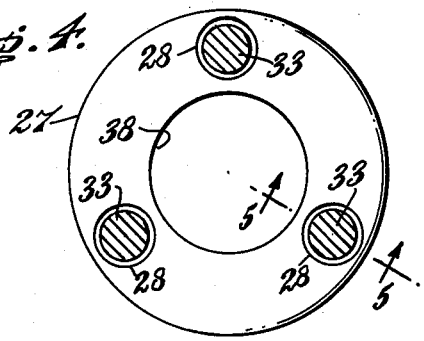
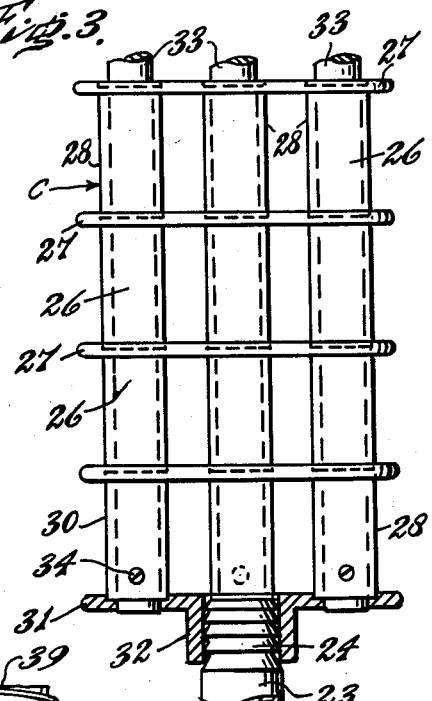
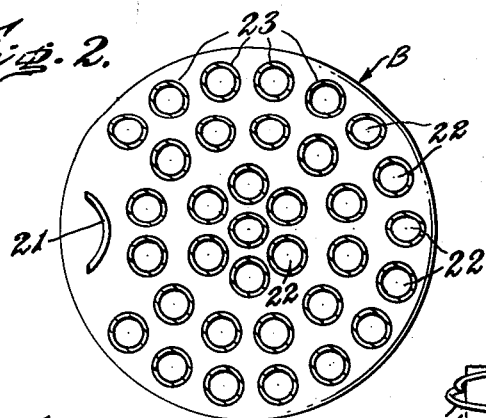
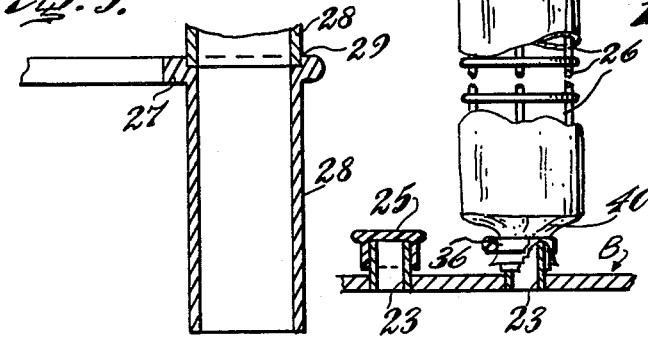
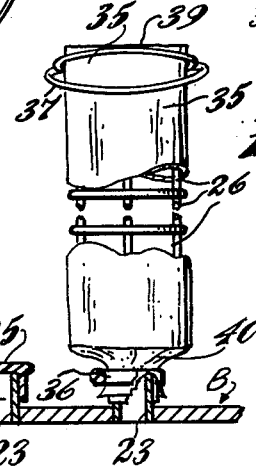
INVENTOR
Ira Silverman
BY Bilker + Mogerman
ATTORNEYS United States Patent Office 3,149,072
Patented Sept. 15, 1964

3,149,072
LIQUID CLARIFICATION APPARATUS
Ira Silverman, R.D. 1, Chalfont, Pa., assignor of fifty percent to Herman Silverman, Doylestown, Pa.
Filed Oct. 30, 1962, Ser. No. 234,162
4 Claims. (Cl. 210—232)

This invention pertains to liquid clarification apparatus. More particularly, it pertains to a filter for removing solids from liquids, which permits ready variation of filtration area.

Enclosed pressure filters are well known in the prior art. In many popular types, the actual filtration is performed by a coating of diatomaceous earth. The filter structure itself, in essence, is merely a means for mechanically supporting the filtration medium. Such filters customarily comprise a filter tank provided with an inlet and an outlet and internal means for supporting a plurality of elements which are connected in parallel hydraulic relationship. Flow through the filter is not commenced until a coating (i.e. a pre-coat) of diatomaceous earth has been laid down upon the elements. Thereafter, liquid to be clarified is pumped through the filter and, from time to time, the filtration surface is renewed by periodic additions of diatomaceous earth.

Such filters have a fixed filter area which is a function of the number of filter elements within the filter tank. A few designs permit variation of the number of filter elements. However, in most instances this means that merely one or two elements can be removed since, if more than that number are removed, various internal sealing relationships would be disturbed.

The elements themselves are often expensive to build and involve the use of fine metallic screen, complicated weldments and expensive construction techniques. Additionally, many designs place great reliance upon the proper seating of ground surfaces or the use of gaskets for preventing flow from the exterior of the filter element to the interior thereof through orifices or gaps which bypass the coating of diatomaceous earth.

Accordingly it is an object of this invention to provide a filter which allows for easy variation, not only of the number of elements present, but also of the filtration area provided by each individual element.

It is a further object of the invention to provide a filter element construction which is extremely inexpensive and is readily adapted to the full utilization of modern materials of construction such as, for instance, plastics.

Still another object of the invention is to provide a filter element which can be sealed to prevent by-pass flow around it without the use of gaskets or any mechanical pressuring devices.

It is also an object of the invention to provide a filter wherein individual elements can be removed and changed without the necessity of disturbing any other element.

Other objects of this invention are to provide an improved filter of the character described which is sturdy in construction, economical to produce and highly efficient in operation.

These and other objects of the invention will be apparent to those skilled in the art from the following description, when read in conjunction with the accompanying drawings, in which:

FIGURE 1 represents an elevation, partly broken away, of a filter embodying the invention.

FIGURE 2 represents a plan view taken along line 2—2 of FIGURE 1.

FIGURE 3 represents a partial sectional view of a filter element used in FIGURE 1, shown in partially assembled condition.

FIGURE 4 represents a top plan view of FIGURE 3.

FIGURE 5 represents a sectional detail taken along line 5—5 of FIGURE 4.

FIGURE 6 represents a partial elevation including an assembled filter element as used in the filter shown in FIGURE 1.

Referring now to the drawings, wherein like numerals designate like parts, it will be seen that filters of the invention, as particularly shown in FIGURES 1 and 3, comprise a filter tank A, a header plate B mounted transversely within the tank A, and a plurality of filter elements C mounted on the plate B and extending longitudinally upward therefrom.

Tank A may be of any conventional design and the art of fabricating A.S.M.E. code pressure vessels is well known. It includes a cylindrical shell portion 10, a removable head 11, a dished bottom 12 and may be provided with usual and customary accessories such as gage 13. Shell portion 10 is provided with an inlet 14, as well as an auxiliary backwash outlet 15. Dished bottom 12 may conveniently be provided with a clear liquid outlet 16 and associated outlet piping 17. If desired, the entire unit may be supported by a cylindrical continuation, 18, of shell 10, or, alternatively, may be provided with independent legs.

Header plate B is shown in greater detail in FIGURE 2. The header, which is mounted transversely within tank A, divides the tank into an inlet zone 19 and a discharge zone 20. Mounted on header plate B proximate inlet 14 is a baffle 21. This baffle is preferably arcuate, both in plan and elevation, to thoroughly disperse the liquid being pumped into the filter so that it will not directly impinge upon filter elements C and possibly knock off any coating of diatomaceous earth thereon. Plate B is provided with a plurality of foramina 22 which preferably, as shown in FIGURE 2, are drilled in a pattern of concentric circles to achieve maximum utilization of area for the mounting of cylindrical filter elements C. Mounted on each foramina and extending upward therefrom into inlet zone 19 is a nipple 23, as shown in FIGURE 3, which terminates in an aligator fitted or adapter portion 24. Those nipples 23 which are not used in a particular filtration application may be provided with a cap 25, as shown best in FIGURE 6.

Filter elements C as shown best in FIGURES 3 to 6 inclusive comprise a plurality of stacking modules 26. Each of these modules includes a horizontal annular portion 27 from which depend downwardly a plurality of hollow legs 28. Annular portions 27 are each provided with a plurality of leg receiving detents 29 on their upper surface or top into which the legs 28 of the next higher module 26 fit. These detents aid in keeping such stacking modules in longitudianl and transverse alignment.

As shown best in FIGURE 3 the modules, generally designated 26 are stacked one on top of the other in interlocking arrangement. At the bottom of the stack a somewhat modified terminal module 30 is provided. This module differs from the other modules, 26 in the array only by the inclusion of a solid disc 31 from which is dependent a downwardly directed nipple 32. The internal diameter of nipple 32 is such that a releasable friction fit is obtained with alligator adapter 24. Disc 31 is permanently attached to or integral with nipple 32 and legs 28 of terminal module 30 are also permanently attached or integral to disc 31. Increased rigidity is lent to each filter element C by a plurality of tying rods 33 which pass through aligned vertical legs 28 as shown best in FIGURE 3. Rods 33 are releasably retained in the legs 28 of terminal module 30 by set screws or pins 34 and may be similarly retained within the legs 28 of the uppermost module 26.

When a filter element C has been made up by the assembly of a sufficient number of modules 26 and tied together with rods 33, of appropriate length, a tubular fabric cover 35 is pulled over the entire assembly of elements 26. This cover is closed at its upper end 39 and its lower end 40 is gathered and retained around the exterior of nipple 32 by a clamp 36. The entire filter element C may be mounted on nipple 23 with the tubular cover 35 and the clamp 36 in place.

Each filter element C is provided with annular spacer 37 which as shown in FIGURE 6 may conveniently take the form of a helix. This spacer is mounted proximate the top of filter element outside of the cover 35 and is concentric therewith. The spacers 37 insure that the filter elements C will be kept in spaced apart relationship and that they will never contact each other. They thus insure that there will be no "bridging" of filter aid between the elements.

The assembly of the unit has already been described in the course of the above discussion. It should be apparent that the novel construction permits the same shell A and header plate B to be used for providing a wide range of effective filtration area. Thus any number of filter units C may be mounted on header B up to the maximum number of holes 22 provided therein. Those nipples 23 not used may be capped as in FIGURE 6. Furthermore, there is permissible variation within the height of each filter unit C since a relatively small number or a relatively large number of stacking modules 26 may comprise each filter unit. The units C may contain identical numbers of modules 28 or may differ among themselves in height. The height of filter units may be decreased or increased in the field by the mere addition or subtraction of modules 28 and replacement of rods 33 and cover 35 to suit. Furthermore, it is obvious that if repair or replacement of a filter unit C is required only one filter unit at a time need be effected since the troublesome unit can be readily removed and a replacement provided without disturbing the balance of the units.

Operation of the filter is conventional. A slurry of clear water and sufficient diatomaceous earth to pre-coat the elements is pumped through inlet 14, passes through the filter units C and returns via the outlet piping 17 to the slurry source. Circulation is continued until the effluent through outlet 17 is clear thus indicating that all area of fabric covers 35 have been evenly pre-coated with diatomaceous earth. Thereafter regular flow is established and the liquid to be filtered or clarified is pumped through inlet 14 and the clear liquid exits through outlet piping 17.

Of course, the fabric 35 is not relied on to perform the filtration, this being the function of the filter aid coated thereon. The clarified liquid which passes through covers 35 enters the cored interiors 38 of filter elements C (which exists because of the annular construction of each stacking module 26) by passing around and between legs 28. Although the stacked modules of filter elements C are rugged and rigid they provide full size flow channels for liquid moving toward nipples 23 and consequently offer substantially no hydraulic resistance to flow. This contrasts with the high hydraulic resistance offered by many of the prior art diatomaceous earth supporting structures such as the wire screening used in pressure leaf filters.

From time to time additional filter aid is added and the coating of diatomaceous earth on the exterior of each filter element grows thicker and thicker. Spacers 37 prevent premature "bridging" by filter aid or diatomaceous earth between the individual filter elements. When pressure drop through the filter (as indicated, for instance, by the reading on gage 13) has risen sufficiently to indicate that cleaning is required, valving (not shown) in the discharge piping arrangement is closed and the filter is backwashed with the wash water containing dirty filter aid going to the sewer or other discharge point through backwash outlet 15. Filters of the invention lend themselves to economical fabrication. The tank A may be made of any conventional ferrous or non-ferrous material. However, the header plate B, the nipples 23, and the filter elements themselves may be inexpensively formed of plastic which is corrosion-resistant and dimensionally stable. Also, all portions of the filter elements C, including modules 26 and 30 as well as tying rods 33 may be made of plastic such as, for instance, styrene. The tubular fabric cover 35 is preferably made from synthetic fabrics such as for instance long chain polyamides of the nylon type of fibers made from methyl terephthalate and ethylene glycol.

It should be noted that the filter elements, unlike many of those in the prior art, do not rely upon any fine metallic screening as a support for the diatomaceous earth coating. Instead they are made entirely from simple synthetic components.

Although the invention has been described in considerable detail, such description is intended to be illustrative rather than limiting, since the invention may be variously embodied and its extent, consequently, is to be determined by the appended claims.

Having described the invention, what is claimed is:

1. A diatomaceous earth filter, wherein the number of square feet of filter surface can be varied over a wide range, comprising a tank; a foraminous internal header plate mounted in said tank defining an inlet zone and a discharge zone; a plurality of parallel nipples mounted on said header plate in registration with its foramina and extending into said inlet zone to provide liquid communication between said inlet zone and said discharge zone; an inlet permitting liquid to flow into said inlet zone; an outlet permitting liquid to flow from said discharge zone; a baffle proximate said inlet; a plurality of cylindrical filter elements mounted on some of said nipples parallel to each other and extending longitudinally into said inlet zone; caps removably mounted on those nipples not having filter elements mounted thereon; each of said cylindrical filter elements comprising a plurality of stacked latticed modules, each module including a thin flat horizontal ring and integral longitudinally extending tubular legs dependent therefrom; the face of said ring remote from said legs being provided with cored detents for supporting the legs of the superimposed module and preventing radial and circumferential displacement thereof, means for mounting said stacked modules on a nipple, a tubular fabric cover removably mounted over said stacked modules, means for gathering and retaining said cover proximate said nipple, annular spacer means mounted coaxially on each filter element and extending concentrically about said cover; and access means permitting removal of any of said filter elements from said inlet zone, said filter when assembled permitting liquid to flow from inlet zone to discharge zone only through said fabric cover.

2. A diatomaceous earth filter, wherein the number of square feet of filter surface can be varied over a wide range, comprising a tank; an internal header plate mounted transversely in said tank defining an inlet zone above it and a discharge zone beneath it; an inlet permitting liquid to flow into said inlet zone; an outlet permitting liquid to flow from said discharge zone; a plurality of cylindrical filter elements removably mounted on said header and extending longitudinally therefrom, parallel to each other, into said inlet zone; each of said cylindrical filter elements comprising a plurality of stacked latticed modules, each module including a thin flat horizontal ring and integral longitudinally extending tubular legs dependent therefrom; the face of said rings remote from said legs being provided with cored detents for supporting the legs of the superimposed module and preventing radial and circumferential displacement thereof; tensioned means cooperating with said legs for keeping said modules in compressive engagement; means for mounting said stacked modules on said header, a closed-end tubular fabric cover removably mounted over each of said filter elements, means for gathering and retaining said cover proximate said header; and access means permitting removal of said filter elements from said filter, said filter, when assembled, permitting liquid to flow from said inlet zone to said discharge zone only through said fabric covers.

3. In a diatomaceous earth filter, wherein the number of square feet of filter surface can be varied over a wide range, a tank; a foraminous internal plate mounted in said tank defining an inlet zone and a discharge zone; a plurality of parallel nipples mounted on said header and extending into said inlet zone; an outlet permitting liquid to flow into said inlet zone; an outlet permitting liquid to flow from said discharge zone; a baffle proximate said inlet; a plurality of cylindrical filter elements removably mounted on said header parallel to each other and extending longitudinally into said inlet zone; each cylindrical filter element comprising a plurality of stacked latticed modules; each module including a thin flat horizontal ring and integral longitudinally extending tubular legs dependent therefrom; the face of said rings remote from said legs being provided with cored detents for supporting the legs of the superimposed module and preventing radial and circumferential displacement thereof; tensioned means cooperating with said legs for keeping said modules in compressive engagement; a closed-end tubular fabric cover removably mounted over said filter element; and access means permitting removal of said filter elements from said inlet zone, said filter, when assembled, permitting flow of liquid from inlet zone to discharge zone only through said fabric cover.

4. In a diatomaceous earth filter, wherein the number of square feet of filter surface can be varied over a wide range, a tank; a foraminous internal plate mounted in said tank defining an inlet zone and a discharge zone; a plurality of parallel nipples mounted on said plate in registration with its foramina and extending into said inlet zone; an inlet permitting liquid to flow into said inlet zone; an outlet permitting liquid to flow from said discharge zone; a plurality of cylindrical filter elements removably mounted on said header parallel to each other and extending longitudinally into said inlet zone; each cylindrical filter element comprising a plurality of stacked latticed modules; each module including a thin flat horizontal ring and integral longitudinally extending tubular legs dependent therefrom; the face of said rings remote from said legs being provided with cored detents for supporting the legs of the superimposed module and preventing radial and circumferential displacement thereof; tensioned means cooperating with said legs for keeping said modules in compressive engagement; longitudinally extending tensioned rods passing through said tubular legs and said cored detents to keep said modules in compressive engagement; a closed-end tubular fabric cover removably mounted over each filter element; access means permitting removal of said filter elements from said inlet zone, said filter, when assembled, permitting flow of liquid from inlet zone to discharge zone only through said fabric cover.

References Cited in the file of this patent

UNITED STATES PATENTS

| | | |
|---|---|---|
| 116,463 | Linton | June 27, 1871 |
| 420,136 | Willis | Jan. 28, 1890 |
| 832,469 | Fleuss | Oct. 2, 1906 |
| 1,705,848 | Austin | Mar. 19, 1929 |
| 2,562,730 | Miller | July 31, 1951 |
| 2,778,503 | White | Jan. 22, 1957 |
| 2,821,305 | Anderson | Jan. 28, 1958 |
| 2,870,914 | Bloch | Jan. 27, 1959 |
| 2,981,416 | Lawlor | Apr. 25, 1961 |
| 3,037,634 | Mills | June 5, 1962 |

FOREIGN PATENTS

| | | |
|---|---|---|
| 411,794 | France | Apr. 19, 1910 |
| 817,724 | Germany | Oct. 18, 1951 |